United States Patent [19]

Nichols et al.

[11] 4,009,141
[45] Feb. 22, 1977

[54] ELECTRICAL INSULATING COMPOSITIONS OF EPOXY RESINS, ZIRCONIUM SILICATE AND ALUMINA

[75] Inventors: Frank S. Nichols, Pittsfield; Charles H. Bliss, Hancock; Robert J. Londergan, Pittsfield, all of Mass.

[73] Assignee: General Electric Company, New York, N.Y.

[22] Filed: July 7, 1972

[21] Appl. No.: 269,771

[52] U.S. Cl. .......................... 260/37 EP; 260/34.2
[51] Int. Cl.² ........................................ C08L 63/00
[58] Field of Search ............................... 260/37 EP

[56] References Cited

UNITED STATES PATENTS

| | | | |
|---|---|---|---|
| 2,768,264 | 10/1956 | Jones et al. | 260/37 EP UX |
| 3,016,580 | 1/1962 | Jaeschke | 260/37 EP UX |
| 3,360,501 | 12/1967 | Widmer et al. | 260/37 EP X |
| 3,586,802 | 6/1971 | Nichols et al. | 260/37 EP UX |
| 3,704,268 | 11/1972 | Wynstra et al. | 260/37 EP X |

OTHER PUBLICATIONS

Lee et al.; Handbook of Epoxy Resins; McGraw–Hill Book Co., 1967; pp. 14–21,24,25,26,27,33,34,35,-17–7.

*Primary Examiner*—Lewis T. Jacobs
*Attorney, Agent, or Firm*—Francis X. Doyle

[57] ABSTRACT

Composition for use in making electrical insulating products such as transformer bushings comprises a mixture of cycloaliphatic epoxy resin, an anhydride curing agent, and a filler material including zirconium silicate and hydrated alumina. To provide for increased pot life of the material, the epoxy resin and a portion of the filler material are stored in one heated vessel while the anhydride curing agent and the remaining filler material are held in a separate heated vessel, the two components being mixed together prior to pouring the material into the product mold.

6 Claims, No Drawings

ELECTRICAL INSULATING COMPOSITIONS OF EPOXY RESINS, ZIRCONIUM SILICATE AND ALUMINA

The present invention relates to epoxy resin compositions and particularly to hardenable epoxy resin compositions suitable for making electrical insulating products such as transformer bushings and the like.

It is an object of the invention to provide a hardenable epoxy resin composition of the above type which cures to a product having high mechanical strength, good electrical properties and low coefficient of thermal expansion.

It is a particular object of the invention to provide separate component mixtures for making a composition of the above type wherein said component mixtures have relatively long pot life and may be readily mixed together for producing the desired hardenable epoxy resin composition.

It is still another object of the invention to provide a method of making the described epoxy resin composition.

Other objects and advantages will become apparent from the following description and the appended claims.

With the above objects in view, the present invention in one of its aspects relates to a method of making a hardenable epoxy resin composition which comprises providing a first mixture comprising a cycloaliphatic epoxy resin compound and a finely divided filler material comprising zirconium silicate and hydrated alumina, providing a second mixture comprising an anhydride curing agent for said epoxy resin compound and a finely divided filler material comprising zirconium silicate, and thereafter mixing together said first mixture and said second mixture for curing said epoxy resin compound.

The cycloaliphatic epoxy resin used in practicing the present invention is particularly advantageous in that when cured it can withstand higher operating temperatures without distortion than other types of conventional epoxy resin compounds. The cycloaliphatic epoxy resin used herein is of the type

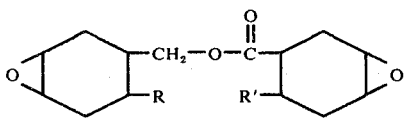

where R and R' are each selected from hydrogen and an aliphatic group. Examples of such epoxy compounds are dicyclodiepoxy monocarboxylates such as 3, 4-epoxy-6-methylcyclohexylmethyl- 3, 4-epoxy-6-methylcyclohexanecarboxylate and 3, 4-epoxycyclohexylmethyl-3, 4-epoxycyclohexanecarboxylate, which are commercially available under the designations ERL 4201 and ERL 4221, respectively. Such epoxy compounds are well known in the art, and are disclosed, for example, in U.S. Pat. Nos. 3,362,908 and 3,586,802.

The curing agent used for this epoxy resin is typically an anhydride of a dicarboxylic acid. Such anhydrides may be of various known types, such as cycloaliphatic (alicyclic), aromatic, and aliphatic, and mixtures thereof. Examples of such anhydrides are hexahydrophthalic anhydride, phthalic anhydride, tetrahydrophthalic anhydride, methyltetrahydrophthalic anhydride, methyltetrahydrophthalic anhydride, methyltetrahydroendomethylenephthalic anhydride, maleic anhydride, and succinic anhydride. A number of other anhydrides of this type which may be used are disclosed in the text of Lee and Neville, Handbook of Epoxy Resins, published 1967 by McGraw-Hill Book Company, New York City, Chapter 12.

A catalyst is also preferably included in the composition to accelerate the curing reaction of the epoxy resin and the anhydride curing agent. Various known accelerators for curing epoxy resins may be used for this purpose, as for example, tertiary amines. Preferred tertiary amines for catalyzing the curing reaction are tris (dimethylaminomethyl) phenol (DMP-30) and benzyldimethylamine (BDMA). Tertiary amine salts may also be used. Other compounds which may be found useful as curing catalysts are stannous octoate, thioglycols, and phenols, among others. Such accelerators and others which may be used are disclosed in the aforementioned Lee and Neville text, Chapter 12-3.

In making electrical insulating products such as transformer bushings which are formed of epoxy resin compositions, and in which metal parts are embedded (e.g., axial conductor members and hardware support members), it has been found desirable to incorporate in the epoxy resin composition a filler of zirconium silicate in finely divided form. Such a filler not only adds high mechanical strength to the product, but also imparts a low coefficient of thermal expansion to the resin material so that it more closely matches the thermal expansion coefficient of the embedded metal parts, thereby providing a more effective seal at the joints. A difficulty encountered in the use of the zirconium silicate filler in cycloaliphatic epoxy resins of the above described type is that is necessary to use relatively high proportions (e.g., over 70% by weight) of the filler relative to the total weight of the resin composition. Such formulations at room temperature are too viscous to pour into the mold for making the desired product, and in order to reduce the viscosity it is necessary to heat the material at temperatures of about 70° to 100° C. However, at such temperatures the epoxy resin begins to react with the curing agent and the pot life or available handling time is very short, often only a few minutes. This problem may be alleviated to some extent by storing the resin and the curing agent in separate heated vessels (with one or both components premixed with the filler material) and bringing the two components together only as they pass through a mixing vessel of small volume before being poured into the molds. However, it has been found that the mixture of cycloaliphatic epoxy resin and zirconium silicate filler when held in such a separate heated (80° C) vessel begins to thicken and becomes semi-solid in less than 8 hours, making it virtually unusable.

In accordance with a feature of the invention, it was found that the incorporation in the resin-filler mixture of a suitable amount of hydrated alumina ($Al_2O_3.H_2O$) in finely divided form would prevent such thickening and maintain the mixture in stable, usable form for a prolonged period, e.g., as long as a week, even when held at a temperature of 80° C. The invention thus makes it possible to hold a relatively large amount of the epoxy resin-filler mixture ready for use over a substantial period of time and avoid the necessity for preparing the mixture each time it is to be poured into the mold.

The following formulations show the range of proportions in percent by weight of the ingredients which may be employed in accordance with the invention:

| FORMULATION A - RESIN COMPONENT | Percent by weight |
|---|---|
| Cycloaliphatic epoxy resin | 20–37% |
| Zirconium silicate | 54–66 |
| Hydrated alumina | 9–36 |
| FORMULATION B - HARDENER COMPONENT | |
| Dicarboxylic acid anhydride | 15–30% |
| Zirconium silicate | 70–85 |
| Curing catalyst (e.g., tertiary amine) | .2–1 |
| FORMULATION C - MIXTURE OF A and B | |
| Cycloaliphatic epoxy resin | 9–18% |
| Zirconium silicate | 70–82.5 |
| Hydrated alumina | 2.5–10 |
| Dicarboxylic acid anhydride | 5–10 |
| Curing catalyst | 0.1–0.75 |

The zirconium silicate and hydrated alumina fillers in the above formulations are in finely divided form and have a particle size of about 200–400 mesh (U.S. Standard), with a typical particle size of about 325 mesh.

The specific amounts of ingredients used in the above formulations for making a particular mixture thereof in accordance with the invention should be such that 0.05–1.0 mole of anhydride curing agent per equivalent of epoxy is provided.

The following is an example of a particular combination of formulations which has provided satisfactory results for the purposes of the invention:

| FORMULATION A' - RESIN COMPONENT | Percent by weight |
|---|---|
| Cycloaliphatic epoxy resin - ERL 4221 | 24% |
| Zirconium silicate - 324 mesh | 58 |
| Hydrated alumina - 325 mesh | 18 |
| FORMULATION B' - HARDENER COMPONENT | |
| Hexahydrophthalic anhydride | 15% |
| Zirconium silicate - 325 mesh | 84.5 |
| Tertiary amine catalyst (DMP 30) | 0.5 |
| FORMULATION C' - MIXTURE OF A' and B' | |
| Cycloaliphatic epoxy resin - ERL 4221 | 9.6% |
| Zirconium silicate - 325 mesh | 76.3 |
| Hydrated alumina - 325 mesh | 4.7 |
| Hexahydrophthalic anhydride | 9.1 |
| Tertiary amine catalyst | 0.3 |

Formulations A' and B' were held in separate dispensing tanks heated at 80° C and portions thereof were mixed together from time to time in the ratio of about 1 part by weight of formulation A' to 1.5 parts of formulation B' to provide the mixture shown in formulation C' for pouring into molds to make transformer bushings. At the end of 1 week, the material remaining in both dispensing tanks was usable for mixing and pouring into the molds.

As will be understood, other ingredients may be incorporated in the described formulations for particular purposes as desired without departing from the scope of the invention, as for example, dyes or other fillers such as quartz powder, glass powder, glass fibers, mica, pigments, etc.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of making a hardenable epoxy resin composition which comprises providing a first mixture comprising a cycloaliphatic epoxy resin compound and a finely divided filler material comprising zirconium silicate and hydrated alumina, providing a second mixture comprising an anhydride curing agent for said epoxy resin compound and a finely divided filler material comprising zirconium silicate, and thereafter mixing together said first mixture and said second mixture for curing said epoxy resin compound.

2. A method as defined in claim 1, said first and second mixtures being heated at about 70°–100° C.

3. A method as defined in claim 2, said first mixture having the following composition in percent by weight:

| Cycloaliphatic epoxy resin | 20–37% |
|---|---|
| Zirconium silicate | 54–66 |
| Hydrated alumina | 9–36 | and said second mixture having the following composition in percent by weight:

| Dicarboxylic acid anhydride | 15–30% |
|---|---|
| Zirconium silicate | 70–85 |

4. A method as defined in claim 3, wherein said first and second mixtures are mixed together in proportions to provide about 0.05–1.0 mole of said anhydride curing agent per epoxy equivalent of said epoxy resin.

5. A method as defined in claim 4, wherein said second mixture includes about 0.2–1% by weight of a curing catalyst for accelerating the curing of said epoxy resin compound.

6. A method as defined in claim 5, said first mixture having the following approximate composition in percent by weight:

| Cycloaliphatic epoxy resin | 24% |
| --- | --- |
| Zirconium silicate | 58 |
| Hydrated alumina | 18 | and said second mixture having the following approximate composition in percent by weight:

| Dicarboxylic acid anhydride | 15% |
| --- | --- |
| Zirconium silicate | 84.5 |
| Curing catalyst | 0.5 |

* * * * *